US012386392B2

(12) United States Patent
Koh

(10) Patent No.: US 12,386,392 B2
(45) Date of Patent: Aug. 12, 2025

(54) ELECTRONIC DEVICE INCLUDING FLEXIBLE DISPLAY, AND CONTROL METHOD THEREFOR

(71) Applicant: SAMSUNG ELECTRONICS CO., LTD., Suwon-si (KR)

(72) Inventor: Sanghyuk Koh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 18/121,918

(22) Filed: Mar. 15, 2023

(65) Prior Publication Data

US 2023/0221769 A1    Jul. 13, 2023

Related U.S. Application Data

(63) Continuation of application No. PCT/KR2021/015111, filed on Oct. 26, 2021.

(30) Foreign Application Priority Data

Nov. 13, 2020    (KR) .................. 10-2020-0151864

(51) Int. Cl.
*G06F 1/16* (2006.01)
*F16M 11/04* (2006.01)
*F16M 13/00* (2006.01)

(52) U.S. Cl.
CPC .......... *G06F 1/1652* (2013.01); *G06F 1/1624* (2013.01); *G06F 1/1677* (2013.01)

(58) Field of Classification Search
CPC .... G06F 1/1624; G06F 1/1652; G06F 1/1677; G09F 9/301; H04M 1/0268
See application file for complete search history.

(56) References Cited

U.S. PATENT DOCUMENTS

2010/0167791 A1    7/2010  Lim
2015/0062027 A1    3/2015  Yang et al.
(Continued)

FOREIGN PATENT DOCUMENTS

CN    108924286    11/2018
CN    108924287    11/2018
(Continued)

OTHER PUBLICATIONS

Korean Office Action issued Nov. 19, 2024 in corresponding Korean Patent Application No. 10-2020-0151864.
(Continued)

*Primary Examiner* — Imani N Hayman
*Assistant Examiner* — Logan F McGowan
(74) *Attorney, Agent, or Firm* — Nixon & Vanderhye P.C.

(57) ABSTRACT

An electronic device according to an embodiment comprises: at least one sensor; a flexible display having at least a part visible to the outside; a driving circuit configured to roll out or roll in the flexible display; and at least one processor operatively connected to the at least one sensor, the flexible display and the driving circuit, wherein the at least one processor can be configured to: confirm the occurrence of an event based on a sensor value of the at least one sensor; confirm a state of the flexible display; confirm whether the flexible display is roll out or roll in and the sliding speed of the flexible display based on the occurrence of an event and the state of the flexible display; and control the driving circuit so that the flexible display is rolled out or rolled in at the sliding speed, based on the rolling out or the rolling in of the flexible display being determined.

10 Claims, 8 Drawing Sheets

(56) References Cited

U.S. PATENT DOCUMENTS

| | | | |
|---|---|---|---|
| 2016/0307545 | A1 | 10/2016 | Lee et al. |
| 2017/0154609 | A1 | 6/2017 | Yoon et al. |
| 2017/0357292 | A1 | 12/2017 | Cho et al. |
| 2019/0042014 | A1 | 2/2019 | Ohata et al. |
| 2019/0073104 | A1 | 3/2019 | Wang |
| 2019/0261519 | A1 | 8/2019 | Park et al. |
| 2020/0249898 | A1 | 8/2020 | Ko et al. |
| 2020/0329435 | A1* | 10/2020 | Lee .................. G06F 1/1698 |

FOREIGN PATENT DOCUMENTS

| | | |
|---|---|---|
| KR | 10-2010-0079100 | 7/2010 |
| KR | 10-2015-0025635 | 3/2015 |
| KR | 10-2016-0123201 | 10/2016 |
| KR | 10-2017-0062327 | 6/2017 |
| KR | 10-2017-0140976 | 12/2017 |
| KR | 10-2018-0089229 | 8/2018 |
| KR | 10-2019-0003454 | 1/2019 |
| KR | 10-2019-0101184 | 8/2019 |

OTHER PUBLICATIONS

International Search Report for PCT/KR2021/015111 mailed Jan. 25, 2022, 5 pages.
Written Opinion of the ISA for PCT/KR2021/015111 mailed Jan. 25, 2022, 4 pages.

* cited by examiner

ELECTRONIC DEVICE INCLUDING FLEXIBLE DISPLAY, AND CONTROL METHOD THEREFOR

CROSS-REFERENCE TO RELATED APPLICATIONS

This application is a continuation of International Application No. PCT/KR2021/05111 designating the United States, filed on Oct. 26, 2021, in the Korean Intellectual Property Receiving Office and claiming priority to Korean Patent Application No. 10-2020-0151864, filed on Nov. 13, 2020, in the Korean Intellectual Property Office, the disclosures of which are incorporated by reference herein in their entireties.

BACKGROUND

Field

The disclosure relates to an electronic device including a flexible display and a method of controlling the same.

Description of Related Art

Various services and additional functions are gradually increasingly provided through electronic devices, for example, portable electronic devices such as smartphones. In order to increase the utilization of the electronic devices and satisfy the needs of various users, communication service providers or electronic device manufacturers are competitively developing electronic devices to provide various functions and differentiate themselves from other companies. Accordingly, various functions provided through electronic devices are increasingly sophisticated.

Along with the development of technologies, the size of a screen display area may be changed in an electronic device including a flexible display by sliding a structure forming the electronic device.

When the size of a screen display area of an electronic device is changed through a sliding operation, an extension sliding operation or a contraction sliding operation is performed at a consistent speed based on an on-going function.

As a sliding operation is performed at a constant speed based on an on-going function in spite of various states of the electronic device or various surrounding situations, an experience suitable for various situations may not be provided.

SUMMARY

Embodiments of the disclosure provide an electronic device which may improve user convenience and prevent and/or reduce damage to the electronic device by additionally recognizing a surrounding situation of the electronic device and extending or contracting a flexible display at a speed suitable for the situation, and a method of controlling the same.

According to various example embodiments, an electronic device may include: at least one sensor, a flexible display at least partially visible to an outside, a driving circuit configured to roll out or roll in the flexible display, and at least one processor operatively connected to the at least one sensor, the flexible display, and the driving circuit. The at least one processor may be configured to: identify occurrence of an event based on a sensor value of the at least one sensor, identify a visible state of the flexible display, determine whether to roll out or roll in the flexible display and a sliding speed of the flexible display based on the occurrence of the event and the visible state of the flexible display, and based on determining to roll out or roll in the flexible display, control the driving circuit to roll out or roll in the flexible display at the sliding speed.

According to various example embodiments, a method of controlling an electronic device may include: identifying occurrence of an event based on a sensor value of at least one sensor, identifying a visible state of a flexible display at least partially visible to an outside, determining whether to roll out or roll in the flexible display and a sliding speed of the flexible display based on the occurrence of the event and the visible state of the flexible display, and based on determining to roll out or roll in the flexible display, controlling a driving circuit to roll out or roll in the flexible display at the sliding speed.

An electronic device according to various example embodiments of the disclosure may not interfere with a user's interaction by a sliding operation of a flexible display and provide an improved user experience without interruption in use of the electronic device.

Further, the electronic device according to various embodiments of the disclosure may improve a protection function by performing a different sliding operation according to a surrounding environment and thus preventing and/or reducing damage to the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
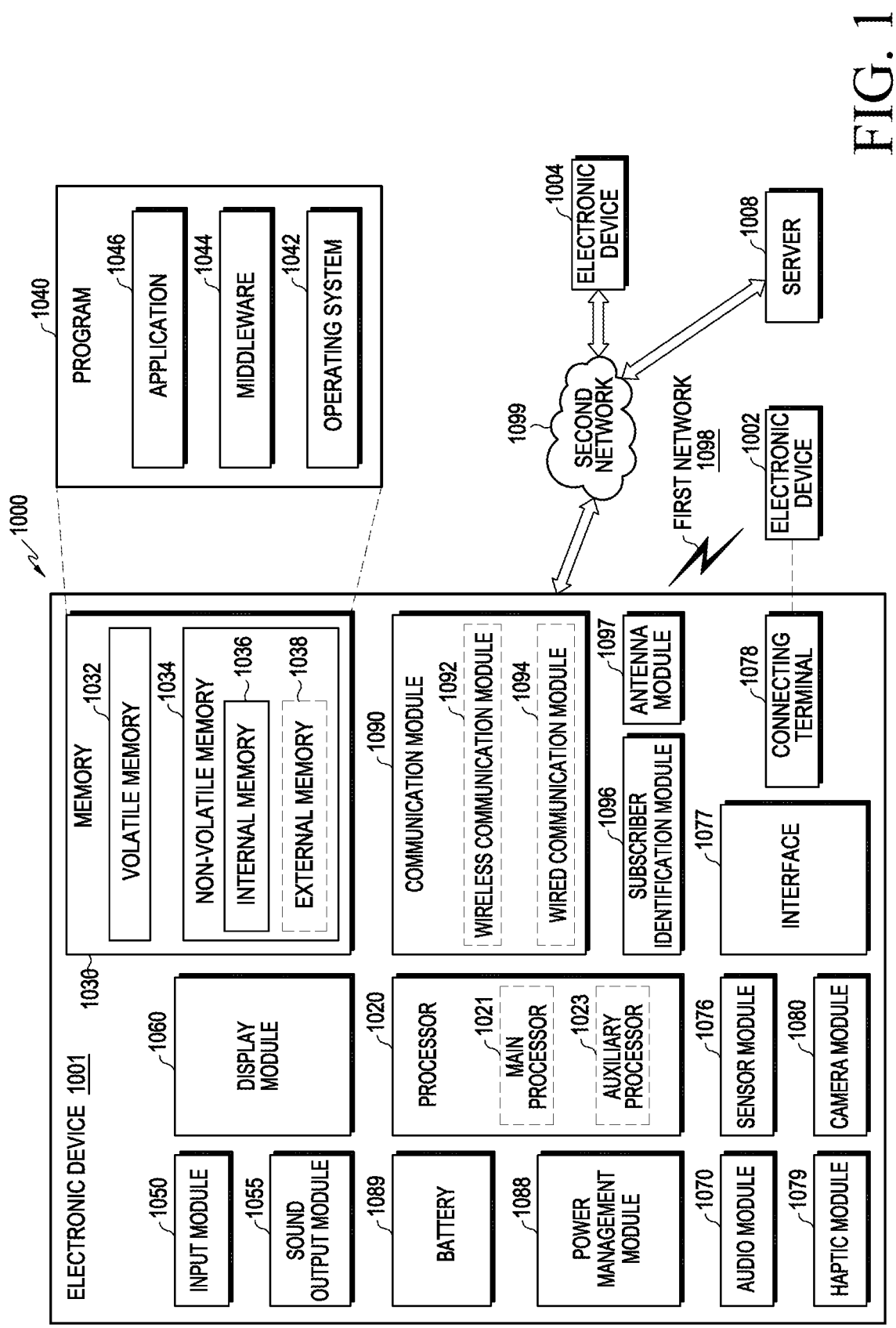
FIG. 1 is a block diagram illustrating an example electronic device in a network environment according to various embodiments.

An electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the 'non-transitory' storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an example electronic device 1001 in a network environment 1000 according to various embodiments. Referring to FIG. 1, the electronic device 1001 in the network environment 1000 may communicate with an electronic device 1002 via a first network 1098 (e.g., a short-range wireless communication network) or an electronic device 1004 or a server 1008 via a second network 1099 (e.g., a long-range wireless communication network). According to an embodiment, the electronic device 1001 may communicate with the electronic device 1004 via the server 1008. According to an embodiment, the electronic device 1001 may include a processor 1020, memory 1030, an input module 1050, a sound output module 1055, a display module 1060, an audio module 1070, a sensor module 1076, an interface 1077, a connecting terminal 1078, a haptic module 1079, a camera module 1080, a power management module 1088, a battery 1089, a communication module 1090, a subscriber identification module (SIM) 1096, or an antenna module 1097. In various embodiments, at least one of the components (e.g., the connecting terminal 1078) may be omitted from the electronic device 1001, or one or more other components may be added in the electronic device 1001. In various embodiments, some of the components (e.g., the sensor module 1076, the camera module 1080, or the antenna module 1097) may be implemented as a single component (e.g., the display module 1060).

The processor 1020 may execute, for example, software (e.g., a program 1040) to control at least one other component (e.g., a hardware or software component) of the electronic device 1001 coupled with the processor 1020, and may perform various data processing or computation. According to an embodiment, as at least part of the data processing or computation, the processor 1020 may store a command or data received from another component (e.g., the sensor module 1076 or the communication module 1090) in volatile memory 1032, process the command or the data stored in the volatile memory 1032, and store resulting data in non-volatile memory 1034. According to an embodiment, the processor 1020 may include a main processor 1021 (e.g., a central processing unit (CPU) or an application processor (AP)), or an auxiliary processor 1023 (e.g., a graphics processing unit (GPU), a neural processing unit (NPU), an image signal processor (ISP), a sensor hub processor, or a communication processor (CP)) that is operable independently from, or in conjunction with, the main processor 1021. For example, when the electronic device 1001 includes the main processor 1021 and the auxiliary processor 1023, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of functions or states related to at least one component (e.g., the display module 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an image signal processor or a communication processor) may be implemented as part of another component (e.g., the camera module 1080 or the communication module 1090) functionally related to the auxiliary processor 1023. According to an embodiment, the auxiliary processor 1023 (e.g., the neural processing unit) may include a hardware structure specified for artificial intelligence model processing. An artificial intelligence model may be generated by machine learning. Such learning may be performed, e.g., by the electronic device 1001 where the artificial intelligence is performed or via a separate server (e.g., the server 1008). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1030 may store various data used by at least one component (e.g., the processor 1020 or the sensor module 1076) of the electronic device 1001. The various data may include, for example, software (e.g., the program 1040) and input data or output data for a command related thereto. The memory 1030 may include the volatile memory 1032 or the non-volatile memory 1034.

The program 1040 may be stored in the memory 1030 as software, and may include, for example, an operating system (OS) 1042, middleware 1044, or an application 1046.

The input module 1050 may receive a command or data to be used by another component (e.g., the processor 1020) of the electronic device 1001, from the outside (e.g., a user) of the electronic device 1001. The input module 1050 may include, for example, a microphone, a mouse, a keyboard, a key (e.g., a button), or a digital pen (e.g., a stylus pen).

The sound output module 1055 may output sound signals to the outside of the electronic device 1001. The sound output module 1055 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1060 may visually provide information to the outside (e.g., a user) of the electronic device 1001. The display module 1060 may include, for example, a display, a hologram device, or a projector and control circuitry to control a corresponding one of the display, hologram device, and projector. According to an embodiment, the display module 1060 may include a touch sensor adapted to detect a touch, or a pressure sensor adapted to measure the intensity of force incurred by the touch.

The audio module 1070 may convert a sound into an electrical signal and vice versa. According to an embodiment, the audio module 1070 may obtain the sound via the input module 1050, or output the sound via the sound output module 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, a SD card connector, or an audio connector (e.g., a headphone connector).

The haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

The camera module 1080 may capture a still image or moving images. According to an embodiment, the camera module 1080 may include one or more lenses, image sensors, image signal processors, or flashes.

The power management module 1088 may manage power supplied to the electronic device 1001. According to an embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, or a fuel cell.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more communication processors that are operable independently from the processor 1020 (e.g., the application processor (AP)) and supports a direct (e.g., wired) communication or a wireless communication. According to an embodiment, the communication module 1090 may include a wireless communication module 1092 (e.g., a cellular communication module, a short-range wireless communication module, or a global navigation satellite system (GNSS) communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, wireless-fidelity (Wi-Fi) direct, or infrared data association (IrDA)) or the second network 1099 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the subscriber identification module 1096.

The wireless communication module 1092 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1092 may support a high-frequency band (e.g., the mmWave band) to achieve, e.g., a high data transmission rate. The wireless communication module 1092 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1092 may support various requirements specified in the electronic device 1001, an external electronic device (e.g., the electronic device 1004), or a network system (e.g., the second network 1099). According to an embodiment, the wireless communication module 1092 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1097 may transmit or receive a signal or power to or from the outside (e.g., the external electronic device) of the electronic device 1001. According to an embodiment, the antenna module 1097 may include an antenna including a radiating element including a conductive material or a conductive pattern formed in or on a substrate (e.g., a printed circuit board (PCB)). According to an embodiment, the antenna module 1097 may include a plurality of antennas (e.g., array antennas). In such a case, at least one antenna appropriate for a communication scheme used in the communication network, such as the first network 1098 or the second network 1099, may be selected, for example, by the communication module 1090 (e.g., the wireless communication module 1092) from the plurality of antennas. The signal or the power may then be transmitted or received between the communication module 1090 and the external electronic device via the selected at least one antenna. According to an embodiment, another component (e.g., a radio frequency integrated circuit (RFIC)) other than the radiating element may be additionally formed as part of the antenna module 1097.

According to various embodiments, the antenna module 1097 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1001 and the external electronic device 1004 via the server 1008 coupled with the second network 1099. Each of the electronic devices 1002 or 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, mobile edge computing (MEC), or client-server computing technology may be used, for example. The electronic device 1001 may provide ultra low-latency services using, e.g., distributed computing or mobile edge computing. In an embodiment, the external electronic device 1004 may include an internet-of-things (IoT) device. The server 1008 may be an intelligent server using machine learning and/or a neural network. According to an embodiment, the external electronic device 1004 or the server 1008 may be included in the second network 1099. The electronic device 1001 may be applied to intelligent services (e.g., smart home, smart city, smart car, or healthcare) based on 5G communication technology or IoT-related technology.

Figure 2:
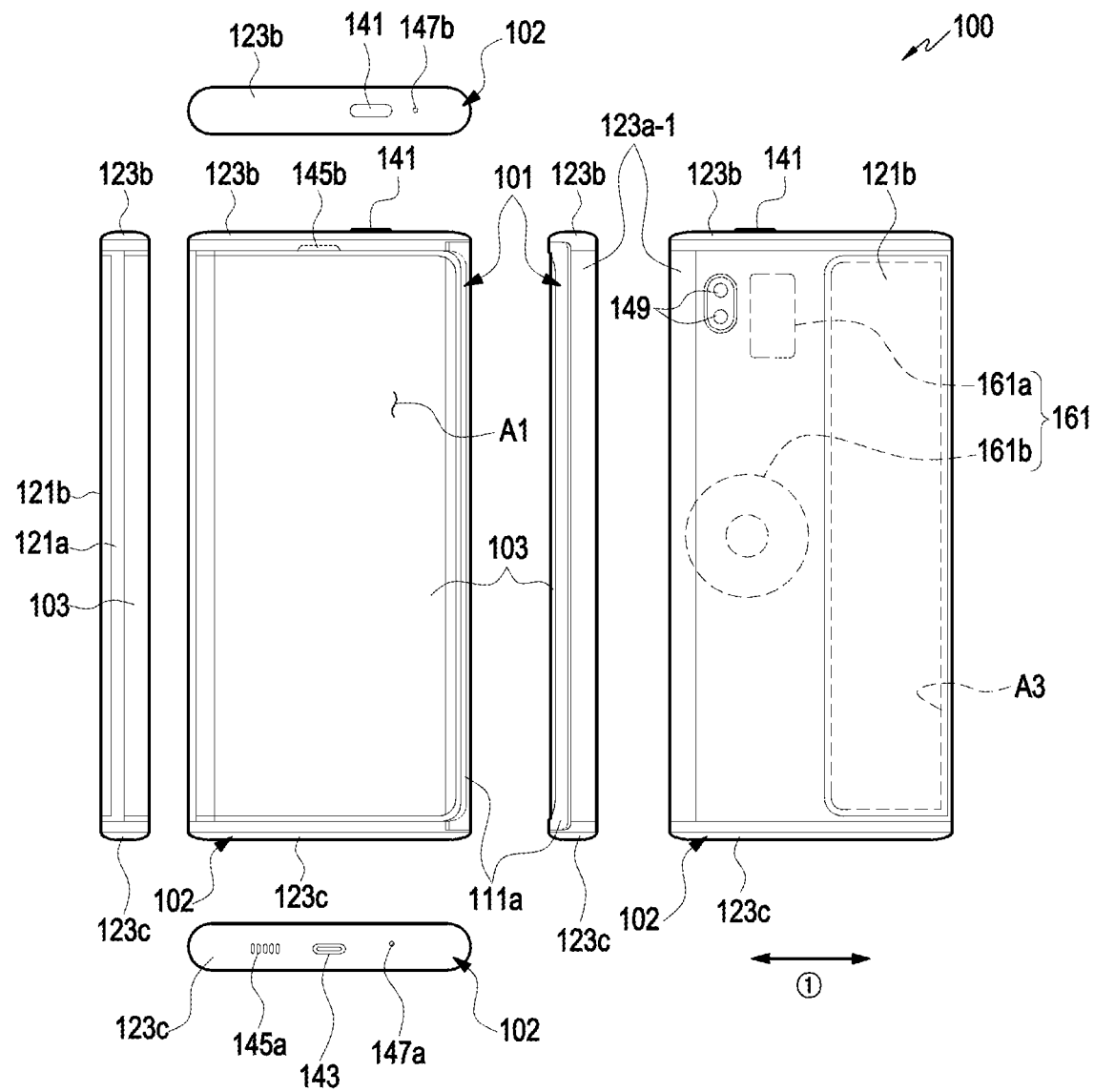
FIG. 2 is a diagram illustrating an electronic device, in which part of a flexible display is accommodated in a second structure according to various embodiments.
Figure 3:
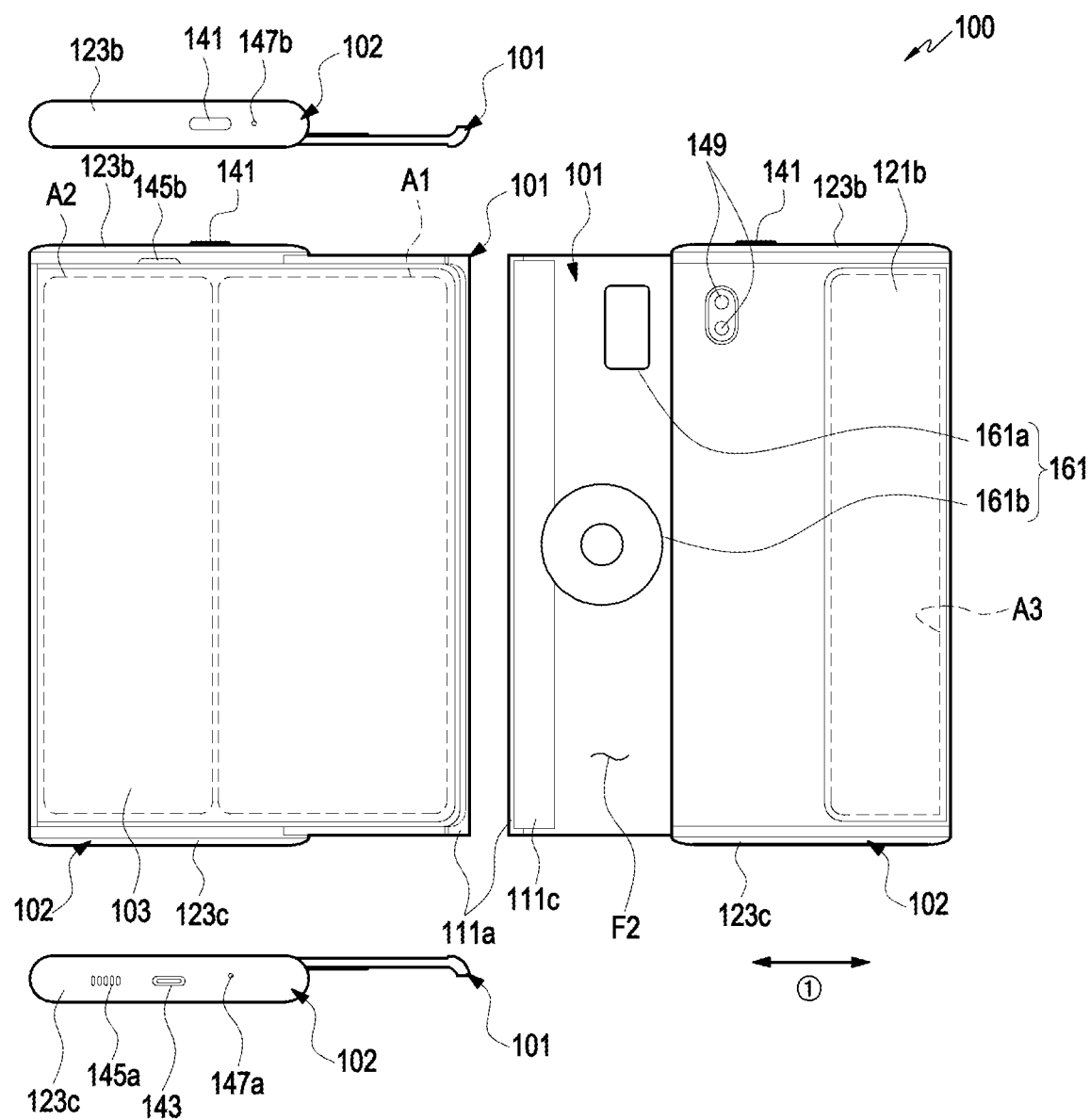
FIG. 3 is a diagram illustrating an electronic device, in which most of a flexible display is visually exposed to the outside of a second structure according to various embodiments.

FIG. 2 is a diagram illustrating an electronic device 100 (e.g., the electronic device 1001 of FIG. 1) according to various embodiments, in which part (e.g., a second area A2) of a flexible display 103 (e.g., the display module 1060 of FIG. 1) is accommodated in a second structure 102. FIG. 3 is a diagram illustrating the electronic device 100 (e.g., the electronic device 1001 of FIG. 1) according to various embodiments, in which most of the flexible display 103 (e.g., the display module 1060 of FIG. 1) is visually exposed to the outside of the second structure 102. The terms "visually exposed", "exposed" and "visible" as used herein with reference to the display may be used interchangeably and include an arrangement in which the display includes a cover glass, protective layer, cover plate, or the like.

The state illustrated in FIG. 2 may be defined as a state in which a first structure 101 is closed with respect to the second structure 102, and the state illustrated in FIG. 3 may be defined as a state in which the first structure 101 is open with respect to the second structure 102. According to an embodiment, a "closed state" or an "open state" may be defined as a state in which the electronic device is closed or open. According to various embodiments, the closed state may be referred to as a "contracted state" of the flexible display 103, and the open state may refer to an "extended state" of the flexible display 103, based on an exposed (e.g., visible) area of the flexible display 103.

The electronic device 100 may include the first structure 101 and the second structure 102 disposed movably on the first structure 101. In various embodiments, this may be understood as a structure in which the first structure 101 is disposed slidably on the second structure 102 in the electronic device 100. According to an embodiment, the first structure 101 may be disposed to be reciprocable between the closed state and the open state with respect to the second structure 102 in an illustrated direction, for example, in a direction indicated by an arrow ①.

According to various embodiments, the first structure 101 may include a first plate 111a (e.g., a slide plate), and include a first surface F1 (see FIG. 4) formed by including at least part of the first plate 111a and a second surface F2 facing in an opposite direction of the first surface F1. According to an embodiment, the second structure 102 may include a second plate 121a (see FIG. 4) (e.g., a rear case), a first sidewall 123a extending from the second plate 121a, a second sidewall 123b extending from the first sidewall 123a and the second plate 121a, a third sidewall 123c extending from the first sidewall 123a and the second plate 121a and parallel to the second sidewall 123, and/or a rear plate 121b (e.g., a rear window). In various embodiments, the second sidewall 123b and the third sidewall 123c may be formed perpendicular to the first sidewall 123a. According to an embodiment, the second plate 121a, the first sidewall 123a, the second sidewall 123b, and the third sidewall 123c may be open on one side (the front surface) thereof to accommodate (or surround) at least part of the first structure 101. For example, the first structure 101 may be coupled with the second structure 102, while being at least partially surrounded, and slide in a direction parallel to the first surface F1 or the second surface F2, for example, in the arrowed direction ① under the guidance of the second structure 102.

According to various embodiments, the second sidewall 123b or the third sidewall 123c may be omitted. According to an embodiment, the second plate 121a, the first sidewall 123a, the second sidewall 123b, and/or the third sidewall 123c may be formed as a separate structure and then combined or assembled. The rear plate 121b may be coupled to cover at least part of the second plate 121a. In various embodiments, the rear plate 121b may be substantially integrally formed with the second plate 121a. According to an embodiment, the second plate 121a or the rear plate 121b may cover at least part of the flexible display 103. For example, the flexible display 103 may be at least partially accommodated inside the second structure 102, and the second plate 121a or the rear plate 121b may cover part (e.g., the second area A2) of the flexible display 103 accommodated inside the second structure 102.

According to various embodiments, the first structure 101 may be movable to the open state or the closed state with respect to the second structure 102 in a first direction (e.g., the direction ①) parallel to the second plate 121a (e.g., the rear case) and the second sidewall 123b. The first structure 101 may move to be placed at a first distance from the first sidewall 123a (e.g., a first sidewall portion 123a-1) in the closed state, and at a second distance greater than the first distance from the first sidewall 123a (e.g., the first sidewall portion 123a-1) in the open state. In various embodiments, the first structure 101 may be located to surround part of the first sidewall 123a (e.g., the first sidewall portion 123a-1) in the closed state.

According to various embodiments, the electronic device 100 may include the display 103, a key input device 141, a connector hole 143, audio modules 145a, 145b, 147a, and 147b, or a camera module 149. While not shown, the electronic device 100 may further include an indicator (e.g., an LED device) or various sensor modules.

According to various embodiments, the display 103 may include a first area A1 and the second area A2. In an embodiment, the first area A1 may extend substantially across at least part of the first surface F1 to be disposed on the first surface F1. The second area A2 may extend from the first area A1 and be inserted or accommodated into the second structure 102 (e.g., a housing) or be visually exposed to the outside of the second structure 102 according to sliding movement of the first structure. As described later, the second area A2 may move under the guidance of a roller 151 (see FIG. 4) mounted on the second structure 102 to be accommodated into the second structure 102 or visually exposed to the outside of the second structure 102. For example, while the first structure 101 slides, part of the second area A2 may be deformed into a curved surface at a position corresponding to the roller 151.

According to various embodiments, when viewed from above the first plate 111a (e.g., the slide plate), upon movement of the first structure 101 from the closed state to the open state, the second area A2 may gradually form a substantially flat surface together with the first area A1 while being visually exposed to the outside of the second structure 102. The display 103 may be combined with or disposed adjacent to a touch sensing circuit, a pressure sensor capable of measuring the intensity (pressure) of a touch, and/or a digitizer detecting a magnetic field-type stylus pen. In an embodiment, the second area A2 may be at least partially accommodated into the second structure 102, and part of the second area A2 may be visually exposed to the outside even in the state illustrated in FIG. 2 (e.g., the closed state). In various embodiments, regardless of the closed state or the open state, the visually exposed part of the second area A2 may be located on the roller 151, and part of the second area A2 may be kept in the form of a curved surface at a position corresponding to the roller 151.

The key input device 141 may be disposed on the second sidewall 123b or the third sidewall 123c of the second structure 102. In consideration of appearance or use conditions, the electronic device 100 may be manufactured without the illustrated key input device 141 or with additional key input device(s). In various embodiments, the electronic device 100 may include a key input device not shown, for example, a home key button or a touch pad disposed around the home key button. According to an embodiment, at least part of the key input device 141 may be located in one area of the first structure 101.

According to various embodiments, the connector hole 143 may be omitted according to an embodiment and accommodate a connector (e.g., a USB connector) for transmitting and receiving power and/or data to and from an external electronic device. While not shown, the electronic device 100 may include a plurality of connector holes 143, and some of the plurality of connector holes 143 may function as connector holes for transmitting and receiving audio signals to and from external electronic devices. While the connector hole 143 is disposed on the third side wall 123c in the illustrated embodiment, it is to be noted that the disclosure is not limited thereto. For example, the connector hole 143 or an additional connector hole not shown may be disposed on the first sidewall 123a or the second sidewall 123b.

According to various embodiments, the audio modules 145a, 145b, 147a, and 147b may include speaker holes 145a and 145b or microphone holes 147a and 147b. One of the speaker holes 145a and 145b may be provided as a receiver hole for a voice call, and the other may be provided as an external speaker hole. In the microphone holes 147a and 147b, a microphone for obtaining external sound may be disposed, and in various embodiments, a plurality of microphones may be disposed to detect the direction of sound. In various embodiments, the speaker holes 145a and 145b and the microphone holes 147a and 147b may be implemented as a single hole, or a speaker (e.g., a piezo speaker) may be included without the speaker holes 145a and 145b. According to an embodiment, the speaker hole indicated by reference number "145b" may be disposed in the first structure 101 and used as a receiver hole for a voice call, and the speaker hole indicated by reference number "145a" (e.g., the external speaker hole) or the microphone holes 147a and 147b may be disposed in the second structure 102 (e.g., one of the side walls 123a, 123b, and 123c).

The camera module 149 may be provided in the second structure 102 and capture a subject in a direction opposite to the first area A1 of the display 103. The electronic device 100 may include a plurality of camera modules 149. For example, the electronic device 100 may include a wide-angle camera, a telephoto camera, or a close-up camera, and according to an embodiment, the electronic device 100 may include an IR projector and/or an IR receiver to measure the distance to a subject. The camera module 149 may include one or more lenses, an image sensor, and/or an image signal processor. While not shown, the electronic device 100 may further include a camera module (e.g., a front camera) that captures a subject in the same direction as the first area A1 of the display 103. For example, the front camera may be disposed around the first area A1 or in an area overlapping with the display 103. When disposed in the area overlapping with the display 103, the front camera may capture a subject through the display 103.

According to various embodiments, the indicator (not shown) of the electronic device 100 may be disposed in the first structure 101 or the second structure 102, and include an LED, thereby providing state information about the electronic device 100 as a visual signal. The sensor module (not shown) of the electronic device 100 may generate an electrical signal or data value corresponding to an internal operating state of the electronic device 100 or an external environmental state. The sensor module may include, for example, a proximity sensor, a fingerprint sensor or a biometric sensor (e.g., an iris/face recognition sensor or a heart rate monitoring (HRM) sensor). In an embodiment, the sensor module may further include, for example, at least one of a gesture sensor, a gyro sensor, a barometric pressure sensor, a magnetic sensor, an acceleration sensor, a grip sensor, a color sensor, an IR sensor, a temperature sensor, a humidity sensor, or an illuminance sensor.

Figure 4:
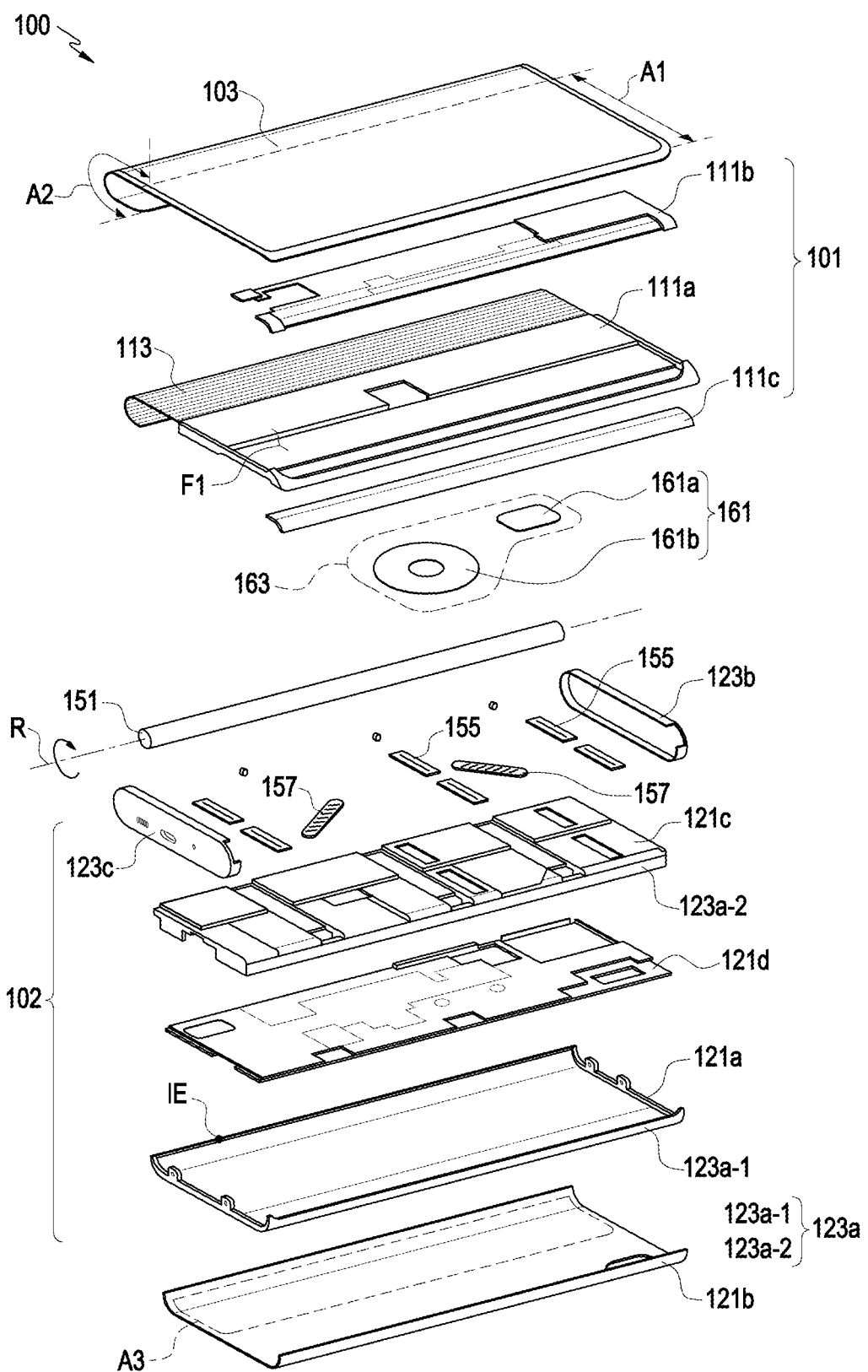
FIG. 4 is an exploded perspective view illustrating an electronic device according to various embodiments.

FIG. 4 is an exploded perspective view illustrating an electronic device (e.g., the electronic device 1001 of FIG. 1 or the electronic device 100 of FIG. 2 or 3) according to various embodiments.

According to various embodiments, the first structure 101 may include the first plate 111a (e.g., the slide plate), a first bracket 111b mounted on the first plate 111a, and/or a second bracket 111c. The first structure 101, for example, the first plate 111a, the first bracket 111b, and/or the second bracket 111c may be formed of a metallic material and/or a non-metallic (e.g., polymer) material. The first plate 111a may be mounted on the second structure 102 (e.g., the housing) and linearly reciprocate in one direction (e.g., in the arrowed direction ① in FIG. 2) under the guidance of the second structure 102. In an embodiment, the first bracket 111b may be coupled with the first plate 111a to form the first surface F1 of the first structure 101 together with the first plate 111a. The first area A1 of the display 103 may be substantially mounted on the first surface F1 and maintained in the form of a flat plate. The second bracket 111c may be coupled with the first plate 111a to form the second surface F2 of the first structure 101 together with the first plate 111a. According to an embodiment, the first bracket 111b and/or the second bracket 111c may be integrally formed with the first plate 111a. This may be appropriately designed in consideration of the assembly structure or manufacturing process of a manufactured product. The first structure 101 or the first plate 111a may be coupled with the second structure 102 to slide with respect to the second structure 102.

According to various embodiments, a multi-joint hinge structure 113 may include a plurality of rods extending in a straight line and disposed parallel to a rotation axis R of the roller 151, and the plurality of rods may be arranged along a direction perpendicular to the rotation axis R, for example, a sliding direction of the first structure 101. In an embodiment, the multi-joint hinge structure 113 may be connected to one end of the first structure 101 to move with respect to the second structure 102 according to sliding movement of the first structure 101. For example, the multi-joint hinge structure 113 may be substantially accommodated into the second structure 102 in the closed state (e.g., the state illustrated in FIG. 2), and extracted to the outside of the second structure 102 in the open state (e.g., the state illustrated in FIG. 3). In various embodiments, part of the multi-joint hinge structure 113 may not be accommodated into the second structure 102 even in the closed state. For example, part of the multi-joint hinge structure 113 may be located to correspond to the roller 151 outside the second structure 102 even in the closed state.

According to various embodiments, the rods of the multi-joint hinge structure 113 may revolve around their other adjacent rods in parallel with the other adjacent rods. Therefore, the multi-joint hinge structure 113 may form a curved surface at a part thereof facing the roller 151 and form a flat surface at a part thereof not facing the roller 151 according to the sliding movement of the first structure 101. In an embodiment, the second area A2 of the display 103 may be mounted or supported on the multi-joint hinge structure 113 and visually exposed to the outside of the second structure 102, together with the first area A1 in the open state (e.g., the state illustrated in FIG. 3). In the state where the second area A2 is visually exposed to the outside of the second structure 102, the multi-joint hinge structure 113 may support or maintain the second area A2 in a flat state by forming a substantially flat surface.

According to various embodiments, the second structure 102 (e.g., the housing) may include the second plate 121a (e.g., the rear case), the rear plate 121b, a third plate 121c (e.g., a front case), and a printed circuit board 121d. In various embodiments, the electronic device 100 may further include a support member not shown. The support member may separate, for example, a gap or space in which part of the display 103 is accommodated from a space in which the printed circuit board 121d is disposed. The second plate 121a, for example, the rear case may be disposed to face in the opposite direction of the first surface F1 of the first plate 111a and substantially provide the exterior shape of the second structure 102 or the electronic device 100. In an embodiment, the second structure 102 may include the first sidewall 123a extending from the second plate 121a, the second sidewall 123b extending from the second plate 121a and substantially perpendicular to the first sidewall 123a, and the third sidewall 123c extending from the second sidewall 123b and the second plate 121a, substantially perpendicular to the first sidewall 123a, and parallel to the second sidewall 123b. While the second sidewall 123b and the third sidewall 123c are manufactured as separate parts from the second plate 121a and mounted or assembled to the second plate 121a in the illustrated embodiment, by way of example, they may be integrally formed with the second plate 121a.

According to various embodiments, the rear plate 121b may be coupled with an outer surface of the second plate 121a and according to an embodiment, may be integrally manufactured with the second plate 121a. In an embodiment, the second plate 121a may be made of a metallic material or a polymer material, and the rear plate 121b may be made of a material such as a metal, glass, a synthetic resin, or ceramic to provide a decorative effect to the exterior of the electronic device 100. According to an embodiment, the second plate 121a and/or the rear plate 121b may be made of a material that transmits light at least partially (e.g., a sub-display area A3). In an embodiment, in the state where part (e.g., the second area A2) of the display 103 is accommodated inside the second structure 102, at least part of the second area A2 may be located to correspond to the sub-display area A3. For example, in the state where the display 103 is accommodated inside the second structure 102, the display 103 may output a screen using at least part of the second area A2, and a user may perceive the output screen through the sub-display area A3.

According to various embodiments, the third plate 121c may be made of a metallic material or a polymer material, and coupled with the second plate 121a (e.g., the rear case), the first sidewall 123a, the second sidewall 123b, and/or the third sidewall 123c to form an inner space of the second structure 102. According to an embodiment, the third plate 121c may be referred to as a "front case", and the first structure 101, for example, the first plate 111a may slide, substantially facing the third plate 121c. In various embodiments, the first sidewall 123a may be formed as a combination of the first sidewall portion 123a-1 extending from the second plate 121a and a second sidewall portion 123a-2 formed at one edge of the third plate 121c. In an embodiment, the first sidewall portion 123a-1 may be coupled to surround one edge of the third plate 121c, for example, the second sidewall portion 123a-2. In this case, the first sidewall portion 123a-1 itself may form the first sidewall 123a.

According to various embodiments, the support member not shown may be disposed in a space between the second plate 121a and the third plate 121c and shaped into a flat plate made of a metallic material or a polymer material. The support member may provide an electromagnetic shielding structure in the inner space of the second structure 102 or improve the mechanical rigidity of the second structure 102. In an embodiment, when accommodated inside the second structure 102, the multi-joint hinge structure 113 and/or a partial area (e.g., the second area A2) of the display 103 may be located in a space between the second plate 121a and the support member.

According to various embodiments, the printed circuit board 121d may be disposed in a space between the third plate 121c and the support member. For example, the printed circuit board 121d may be accommodated in a space separated from a space in which the multi-joint hinge structure 113 and/or a partial area of the display 103 is accommodated inside the second structure 102 by the support member not shown. A processor, memory, and/or an interface may be mounted on the printed circuit board 121d. The processor may include, for example, at least one of a CPU, an AP, a GPU, an image signal processor, a sensor hub processor, or a CP.

The memory may include, for example, volatile memory or non-volatile memory.

The interface may include, for example, an HDMI, a USB interface, an SD card interface, and/or an audio interface. The interface may electrically or physically connect the electronic device 100 to an external electronic device and include a USB connector, an SD card/multimedia card (MMC) connector, or an audio connector.

According to various embodiments, the display 103 may be an organic light emitting diode (OLED)-based flexible display and at least partially deformable into a curved surface while being maintained in the shape of a flat surface as a whole. In an embodiment, the first area A1 of the display 103 may be mounted on or attached to the first surface F1 of the first structure 101 and maintained in the shape of a substantially flat plate. The second area A2 may extend from the first area A1 and be supported by or attached to the multi-joint hinge structure 113. For example, the second area A2 may extend along the sliding direction of the first structure 101, be accommodated inside the second structure 102, together with the multi-joint hinge structure 113, and be deformed into a curved surface at least partially according to the deformation of the multi-joint hinge structure 113.

According to various embodiments, as the first structure 101 slides on the second structure 102, the area of the display 103 visually exposed to the outside may change. The electronic device 100 (e.g., the processor) may change an area of the display 103 that is activated based on the area of the display 103 visually exposed to the outside. For example, the electronic device 100 may activate an area of the second structure 102 visually exposed to the outside out of the entire area of the display 103 in the open state or at an intermediate position between the closed state and the open state. In the closed state, the electronic device 100 may activate the first area A1 of the display 103 and deactivate the second area A2. In the absence of a user input during a certain period of time (e.g., 30 seconds or 2 minutes) in the closed state, the electronic device 100 may deactivate the entire area of the display 103. In various embodiments, with the entire area of the display 103 deactivated, the electronic device 100 may provide visual information through the sub-display area A3 by activating a partial area of the display 103, when needed (e.g., a notification according to a user setting, a missed call, or a notification of message arrival).

According to various embodiments, in the open state (e.g., the state illustrated in FIG. 3), substantially the entire area (e.g., the first area A1 and the second area A2) of the display 103 may be visually exposed to the outside, and the first area A1 and the second area A2 may be disposed to form a flat surface. In an embodiment, even in the open state, part (e.g., one end) of the second area A2 may be located to correspond to the roller 151, and the part of the second area A2 corresponding to the roller 151 may be maintained in the shape of a curved surface. For example, in various embodiments of the disclosure, even though it is said that "in the open state, the second area A2 is disposed to form a flat surface", part of the second area A2 may be maintained in the form of a curved surface. Similarly, even though it is said that "in the closed state, the multi-joint hinge structure 113 and/or the second area A2 is accommodated inside the second structure 102", part of the multi-joint hinge structure 113 and/or the second area A2 may be located outside the second structure 102.

According to various embodiments, a guide member, for example, the roller 151 may be mounted rotatably on the second structure at a position adjacent to one edge of the second structure 102 (e.g., the second plate 121a). For example, the roller 151 may be disposed adjacent to an edge (a part indicated by reference character 'IE') of the second plate 121a parallel to the first sidewall 123a. While not assigned a reference numeral in the drawings, another sidewall may extend from an edge of the second plate 121a adjacent to the roller 151, and the sidewall adjacent to the roller 151 may be substantially parallel to the first sidewall 123a. In an embodiment, the sidewall of the second structure 102 adjacent to the roller 151 may be made of a light-transmitting material, and part of the second area A2 may provide visual information through part of the second structure 102, while being accommodated in the second structure 102. "May be disposed adjacent to" may refer, for example, to an arrangement with a gap of 5 mm or less. For example, the roller 151 may be disposed spaced apart from the edge (e.g., the part indicated by reference character 'IE') of the second plate 121a parallel to the first sidewall 123a by 5 mm or less.

According to various embodiments, the roller 151 may have one end rotatably coupled with the second sidewall 123b and the other end rotatably coupled with the third sidewall 123c. For example, the roller 151 may be mounted on the second structure 102 and rotate around the rotation axis R perpendicular to the sliding direction (e.g., the arrowed direction ① in FIG. 2 or 3) of the first structure 101. The rotation axis R may be disposed substantially parallel to the first side wall 123a and located far from the first sidewall 123a, for example, at one edge of the second plate 121a. In an embodiment, a gap between an outer circumferential surface of the roller 151 and an inner surface of the edge of the second plate 121a may form an inlet through which the multi-joint hinge structure 113 or the display 103 enters the second structure 102.

According to various embodiments, when the display 103 is deformed into a curved surface, the roller 151 may maintain a radius of curvature of the display 103 at a predetermined level, thereby suppressing excessive deformation of the display 103. "Excessive deformation" may refer, for example, to deformation with so small a radius of curvature as to damage pixels or a signal line included in the display 103. For example, the display 103 may be moved or deformed under the guidance of the roller 151 and protected from damage caused by excessive deformation. In various embodiments, the roller 151 may rotate while the multi-joint hinge structure 113 or the display 103 is inserted into or extracted from the second structure 102. For example, as the roller 151 rotates, friction between the multi-joint hinge structure 113 (or the display 103) and the second structure 102 may be suppressed or prevented, thereby enabling the multi-joint hinge structure 113 (or the display 103) to make insertion/extraction of the second structure 102 smooth.

According to various embodiments, the electronic device 100 may further include guide rail(s) 155 and/or actuating member(s) 157. The guide rail(s) 155 may be mounted on the second structure 102, for example, the third plate 121c to guide sliding of the first structure 101 (e.g., the first plate 111a or the slide plate). The actuating member(s) 157 may include a spring or spring module that provides an elastic force to both ends of the actuating member(s) 157 in a direction away from each other, and the driving member(s) 157 may have one end rotatably supported by the second structure 102 and the other end rotatably supported by the first structure 101.

According to various embodiments, when the first structure 101 slides, both ends of the driving member(s) 157 may be located closest to each other at any one point (hereinafter referred to as a 'closest point') between the closed state and the open state. For example, the driving member(s) 157 may provide an elastic force to the first structure 101 in a direction toward the closed state in a section between the closest point and the closed state and in a direction toward the open state in a section between the closest point and the open state.

According to various embodiments, an antenna structure 161 may be disposed in at least one of the first structure 101 and the second structure 102, for example, the first structure 101. In an embodiment in which the antenna structure 161 is disposed in the first structure 101, the antenna structure 161 may be selectively exposed to an external space. For example, the antenna structure may be disposed and concealed between the first structure 101 and the second structure 102 in the closed state and exposed to the external space in the open state. The antenna structure 161 may include a loop antenna formed of an array of electrically conductive bodies, for example, electrically conductive lines on a flat surface or a flat plate. In various embodiments, the antenna structure 161 may include a patch antenna, a monopole antenna, a dipole antenna, or an inverted F-antenna depending on the arrangement or shape of the electrically conductive bodies. The antenna structure may be configured to perform at least one of, for example, near field communication (NFC), wireless power transmission and reception, or magnetic secure transmission (MST). However, the wireless communication through the antenna structure 161 is not limited thereto. For example, the electronic device 100 may use the antenna structure 161 to access a mobile or cellular communication network, a local area network (LAN), a wireless local area network (WLAN), a wide area network (WLAN), the Internet, or a small area network (SAN). According to an embodiment, the antenna structure 161 may include a first antenna 161a for MST and a second antenna 161b for NFC and/or wireless power transmission. In various embodiments, the first antenna 161a may be configured to perform NFC and/or wireless charging, and the second antenna 161b may be used for MST.

According to various embodiments, the antenna structure 161, for example, the first antenna 161a and/or the second antenna 161b may be provided on an attachment sheet 163 and disposed in the first structure 101. For example, with the first antenna 161a and the second antenna 161b disposed on the attachment sheet 163, the attachment sheet 163 may be attached to the first structure 101 (e.g., the second surface A2). According to an embodiment, the antenna structure 161 may be disposed to substantially overlap with the first area A1. While the first antenna 161a and the second antenna 161b are shown in FIG. 2, the antenna structure 161 may be concealed so as not to be exposed to the user's eyes in a real product.

In the following detailed description, the same reference numerals or no reference numerals may be assigned to components that may be easily understood from the preceding embodiments in the drawings, and a detailed description of the components may also be omitted. An electronic device (e.g., the electronic device 100 of FIGS. 2 to 4) according to various embodiments of the disclosure may be implemented by selectively combining configurations of different embodiments, and a configuration of an embodiment may be replaced with a configuration of an embodiment. For example, it is to be noted that the disclosure is not limited to a specific drawing or embodiment.

The following operations of the electronic device 100 may be performed by the processor included in the electronic device 100. For convenience of description, however, a description will be given on the assumption of the electronic device 100 as an entity responsible for the operations.

Figure 5:
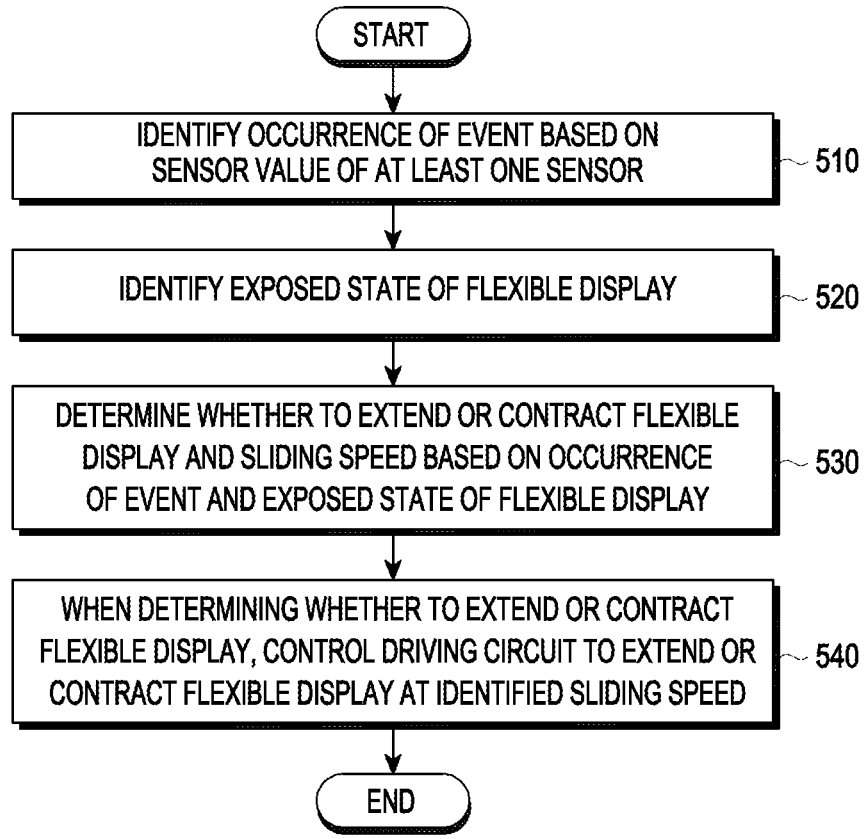
FIG. 5 is a flowchart illustrating an example operation of controlling a sliding speed of a flexible display in an electronic device according to various embodiments.

FIG. 5 is a flowchart illustrating an example operation of controlling a sliding speed of a flexible display in an electronic device according to various embodiments.

According to various embodiments, referring to FIG. 5, an electronic device (e.g., the electronic device 1001 of FIG. 1, the processor 1020 of FIG. 1, or the electronic device 100 of FIG. 2) may identify occurrence of an event based on a sensor value of at least one sensor (e.g., the sensor module 1076 of FIG. 1) in operation 510. For example, the electronic device may identify occurrence of an event related to a surrounding environment of the electronic device based on a sensor value of at least one sensor.

According to various embodiments, upon identification of the occurrence of the event, the electronic device may identify a state of a flexible display (e.g., the display module 1060 of FIG. 1 or the flexible display 103 of FIG. 2) corresponding to the identified event. For example, the electronic device may identify whether a state of the flexible display to be taken is an extended state or a contracted state in a surrounding situation corresponding to the event.

According to various embodiments of the disclosure, when the electronic device has been placed in a bag or pocket during a set time or longer, the electronic device may identify that an event has occurred based on a sensor value of at least one sensor. For example, when identifying that an ambient illuminance value of the electronic device is less than a set illuminance value during a set time based on a sensor value of at least one sensor (e.g., an illuminance sensor, a proximity sensor, a light sensor, an ultrasonic sensor, or an IR sensor), the electronic device may identify that an event has occurred. According to various embodiments of the disclosure, when the illuminance value of the electronic device is less than the set illuminance value and an acceleration sensor operates, the electronic device may identify that it is placed in a bag or pocket. According to various embodiments, the electronic device may identify that a state of the flexible display to be taken in the situation where the electronic device has been placed in the bag or pocket during the set time or longer is the contracted state.

According to various embodiments of the disclosure, when identifying a situation in which the electronic device has entered and is about to be mounted in an external mounting device, the electronic device may identify that an event has occurred. For example, when identifying that the electronic device has been connected to (paired with) a communication module (e.g., wireless communication such as vehicle Bluetooth, vehicle Wi-Fi, or vehicle NFC, or USB jack-based wired communication) of a vehicle as an external device through a communication module (e.g., the communication module 1090 of FIG. 1), the electronic device may identify that the electronic device has entered the vehicle. According to various embodiments of the disclosure, when identifying that the electronic device has entered the vehicle and the distance between the electronic device and the external mounting device is less than a set value based on a sensor value of at least one sensor (e.g., a proximity sensor, an optical sensor, an ultrasonic sensor, or an IR sensor), the electronic device may identify that an event has occurred. According to various embodiments of the disclosure, when the electronic device is connected to the communication module of the vehicle, and a route guidance function is executed in a navigation application, the electronic device may identify that an event that the electronic device is to be mounted on the external mounting device has occurred. According to various embodiments of the disclosure, when the electronic device approaches the external mounting device inside the vehicle, the electronic device may identify that a state of the flexible display to be taken is the contracted state. According to various embodiments, when an extended state or a contracted state is available to the mounting device, and the mounting device is in the extended state, the electronic device may identify the state of the flexible display corresponding to the generated event as the extended state. For example, the electronic device may identify that the mounting device is in the extended state based on the communication module or a sensor value of at least one sensor.

According to various embodiments, when identifying that the electronic device is approaching a wireless charging device for wireless charging based on a sensor value of at least one sensor, the electronic device may identify that an event has occurred. For example, when identifying that the distance between the electronic device and the wireless charging device is less than a set value based on a sensor value of at least one sensor (e.g., an electromagnetic inductive proximity sensor, an optical sensor, an ultrasonic sensor, or an IR sensor), the electronic device may identify that an event has occurred. According to various embodiments of the disclosure, when the electronic device is approaching the wireless charging device, the electronic device may identify a state of the flexible display to be taken as the contracted state.

According to various embodiments, upon receipt of a writing input in an edge area of the flexible display during writing input, the electronic device may identify that an event has occurred. For example, upon detection of a writing input in an edge area of the flexible display based on a sensor value of at least one sensor (e.g., a proximity sensor, an optical sensor, an ultrasonic sensor, an IR sensor, or a pressure sensor) in a writing input mode, the electronic device may identify that an event has occurred. For example, the edge area may refer to an area of a set size located at an end of an exposed (e.g., visible) area of the flexible display, and the writing input may be performed by a stylus pen or a user's finger. According to various embodiments, the electronic device may identify whether a writing input is performed in the edge area based on the coordinates of a position where the writing input is received on the flexible display. According to various embodiments of the disclosure, when identifying that a writing input is performed in the edge area of the flexible display, and the electronic device is placed on a flat surface based on a sensor value of at least one sensor (e.g., a gyro sensor or an acceleration sensor), the electronic device may identify that an event has occurred. According to various embodiments of the disclosure, in a situation where a writing input is received in the edge area of the flexible display, the electronic device may identify a state of the flexible display to be taken as the extended state.

According to various embodiments, when identifying that the electronic device is in danger based on a sensor value of at least one sensor, the electronic device may identify that an event has occurred. For example, when identifying that the electronic device is falling at a set speed or higher based on a sensor value of at least one sensor (e.g., an acceleration sensor, a gyro sensor, or an acceleration-gyro sensor), the electronic device may identify that an event has occurred. According to various embodiments, the electronic device may identify a state of the flexible display to be taken as the contracted state in a situation in which the electronic device is falling.

In an embodiment, when identifying that the electronic device is submerged based on a sensor value of at least one sensor (e.g., an electrode sensor, a touch sensor, or a humidity sensor of a charging terminal), the electronic device may identify that an event has occurred. For example, when identifying that the value of the electrode sensor has been changed to a value indicating that the electrode sensor contacts water or a touch is detected in an area of a certain size or larger out of an exposed (e.g., visible) area of the flexible display, the electronic device may identify that it is submerged. According to various embodiments, the electronic device may identify a state of the flexible display to be taken is the contracted state in a situation where the electronic device is submerged.

According to various embodiments, when identifying that the surroundings are dark during image capturing through a camera disposed on the front surface of the electronic device, the electronic device may identify that an event has occurred. For example, when an ambient illuminance of the electronic device is less than a set value based on a sensor value of at least one sensor (e.g., an illuminance sensor, a proximity sensor, an optical sensor, an ultrasonic sensor, an IR sensor, or a camera sensor) in a selfie mode, the electronic device may identify that an event has occurred. According to various embodiments of the disclosure, in a situation where the surroundings are dark in the selfie mode, the electronic device may identify a state of the flexible display to be taken as the extended state so that part of an exposed (e.g., visible) area of the flexible display serves as a lighting.

According to various embodiments, the electronic device may identify an exposed (e.g., visible) state of the flexible display in operation 520. For example, upon identification of the occurrence of the event, the electronic device may identify whether the current exposed (e.g., visible) state of the flexible display is the extended state or the contracted state.

While it has been illustrated and described in FIG. 5 that operation 520 of identifying the current exposed (e.g., visible) state of the flexible display is performed after operation 510 of identifying the occurrence of an event, the electronic device may identify whether an event has occurred based on a sensor value of at least one sensor with information about the current exposed (e.g., visible) state of the flexible display already stored according to various embodiments. In an embodiment, when the current exposed (e.g., visible) state of the flexible display is included in a condition of identifying whether an event has occurred, the electronic device may identify that an event has occurred only when the current exposed (e.g., visible) state of the flexible display satisfies the condition in operation 510.

According to various embodiments, the electronic device may identify whether to extend (e.g., roll out) or contract (e.g., roll in) the flexible display and a sliding speed based on the occurrence of the event and the exposed (e.g., visible) state of the flexible display in operation 530. For example, when it is said that it is identified whether to extend or contract the flexible display, this may refer, for example, to determining whether to extend or contract the flexible display. When it is said that a sliding speed is identified, this may refer, for example, to a sliding speed of the flexible display being determined, obtained, or calculated.

For example, the electronic device may identify whether to extend or contract the flexible display by comparing the state of the flexible display corresponding to the event that has occurred with the current state of the flexible display. For example, the current state of the flexible display may be the extended state or the contracted state.

For example, when the state of the flexible display corresponding to the event that has occurred is different from the current state of the flexible display, the electronic device may identify that the state of the flexible display is to be changed to the state of the flexible display corresponding to the event that has occurred. In an embodiment, when the state of the flexible display corresponding to the event that has occurred is identical to the current state of the flexible display, the electronic device may identify that the current state of the flexible display is to be maintained.

According to various embodiments of the disclosure, when the current state of the flexible display is the extended state in a situation where the electronic device has been placed in a bag or pocket during a set time or longer, the electronic device may identify that the flexible display is to be changed to the contracted state.

According to various embodiments of the disclosure, when the current state of the flexible display is the extended state in a situation where the electronic device has entered a vehicle and approaches a mounting device, the electronic device may identify that the flexible display is to be changed to the contracted state.

According to various embodiments of the disclosure, in a situation where the electronic device has entered a vehicle, and a mounting device is in the extended state, when the flexible display is currently in the contracted state, the electronic device may identify that the flexible display is to be changed to the extended state, or when the flexible display is currently in the extended state, the electronic device may identify that the state of the flexible display is to be maintained.

According to various embodiments of the disclosure, when the current state of the flexible display is the extended state in a situation where the electronic device approaches a wireless charging device, the electronic device may identify that the flexible display is to be changed to the contracted state.

According to various embodiments, when the flexible display is currently in the contracted state in a situation where a writing input is received in an edge area of the flexible display, the electronic device may identify that the flexible display is to be changed to the contracted state.

According to various embodiments, when the flexible display is currently in the extended state in a situation where the electronic device is dropped or submerged, the electronic device may identify that the flexible display is to be changed to the contracted state.

According to various embodiments of the disclosure, when the flexible display is currently in the contracted state in a situation where an image is captured by a camera disposed on the front surface of the electronic device in a dark environment, the electronic device may identify that the flexible display is to be changed to the extended state.

According to various embodiments, when identifying that the flexible display is to be extended or contracted, the electronic device may identify a sliding speed corresponding to the event that has occurred among a plurality of sliding speeds mapped respectively to a plurality of events stored in memory (e.g., the memory 1030 of FIG. 1).

For example, upon identification of the occurrence of an event (e.g., a situation) based on at least one sensor value, the electronic device may identify (e.g., determine) an operation mode of the flexible display corresponding to the identified event in a sliding operation mode mapped to each event, as illustrated in [Table 1]. For example, the operation mode of the flexible display may be classified as a normal sliding mode, a quick sliding mode, or an emergency sliding mode. According to various embodiments, two modes or four or more modes may be defined. According to various embodiments, the electronic device may identify (e.g., determine, obtain, or calculate) an operating speed of the flexible display corresponding to the event without determining the mode corresponding to the event.

TABLE 1

| situation | Operation mode |
| --- | --- |
| User places extended device in pocket or bag for certain time or longer | Normal sliding mode |
| User enters user's vehicle and is about to mount extended device on device | |
| User is approaching wireless charger for charging, carrying extended device | Quick sliding mode |
| Writing input is detected in edge area of flexible display of contracted device | |
| Extended device is falling at certain speed or higher | Emergency sliding mode |
| Extended device is submerged | |
| Image is captured in selfie mode in dark environment | |

For example, the quick sliding mode may be for a situation in which a faster sliding operation is required for use by the user, and the emergency sliding mode may be for a situation in which the electronic device is likely to be damaged or a sliding operation needs to be completed within a short time.

According to various embodiments, the electronic device may identify a sliding speed corresponding to the identified mode among the sliding speeds of the flexible display mapped respectively to the modes of the electronic device, as illustrated in [Table 2]. According to various embodiments, a sliding speed may be expressed as a time taken to move a specific distance in [Table 2].

For example, the sliding speed may be N seconds (sec) in the normal sliding mode, N/2 seconds in the quick sliding mode, and N/3 seconds in the emergency sliding mode. According to various embodiments, the sliding speed in the emergency sliding mode may be a maximum sliding speed of the flexible display. According to various embodiments, the sliding speed for each mode may be different from Table 2, and a sliding speed lower than that of the normal sliding mode may be mapped according to a mode.

TABLE 2

| Mode | Sliding speed |
| --- | --- |
| Normal sliding mode | N sec |
| Quick sliding mode | N/2 sec |
| Emergency sliding mode | N/3 sec |

According to various embodiments, when the flexible display is to be extended or contracted without a mapped mode, the electronic device may identify a sliding speed of the flexible display as the sliding speed of the normal sliding mode.

While it has been described above that the electronic device determines a mode based on a sensor value and identifies a sliding speed corresponding to the mode, a sliding speed may be mapped to each situation, so that upon occurrence of an event, a sliding speed is immediately identified according to various embodiments.

According to various embodiments, the electronic device may identify a sliding speed corresponding to an event even without mapping information between events and sliding speeds. For example, when an event satisfies a set condition, the electronic device may set the sliding speed of the flexible display to be higher or lower than a set normal sliding speed.

According to various embodiments of the disclosure, the electronic device may calculate the sliding speed using at least some of sensor values of at least one sensor used to identify the occurrence of the event. For example, even when sliding speeds are not mapped, the electronic device may calculate a sliding speed suitable for a situation, in consideration of one or more of an ambient illuminance, an acceleration of the electronic device, whether a writing is input to the edge area of the flexible display, whether communication is connected to an external device, a distance to an external device, whether the electronic device is submerged, an ambient illuminance during capturing by a camera disposed on the front surface of the electronic device, a power consumption, and a battery charging state, based on a sensor value.

According to various embodiments, the electronic device may obtain a sliding speed based on at least one sensor value using a deep learning model. For example, the deep learning model is trained using a sensor value for each situation and a sliding speed set for each situation, and a sliding speed suitable for a situation may be obtained even in a situation where sliding speeds are not mapped.

According to various embodiments of the disclosure, when determining to extend or contract the flexible display, the electronic device may control a driving circuit to extend or contract the flexible display at the identified sliding speed in operation 540. For example, the driving circuit may automatically extend or contract the flexible display without a user's manual operation, and include a roller (e.g., the roller 151 of FIG. 3) and a motor that rotates the roller.

According to various embodiments, the electronic device may provide a feedback of at least one of whether to extend or contract the flexible display or the sliding speed of the flexible display. For example, the feedback may include an audio feedback, a vibration feedback, or message display. According to various embodiments, an operation of providing a feedback through message display will be described in more detail with reference to FIG. 8.

Figure 6:
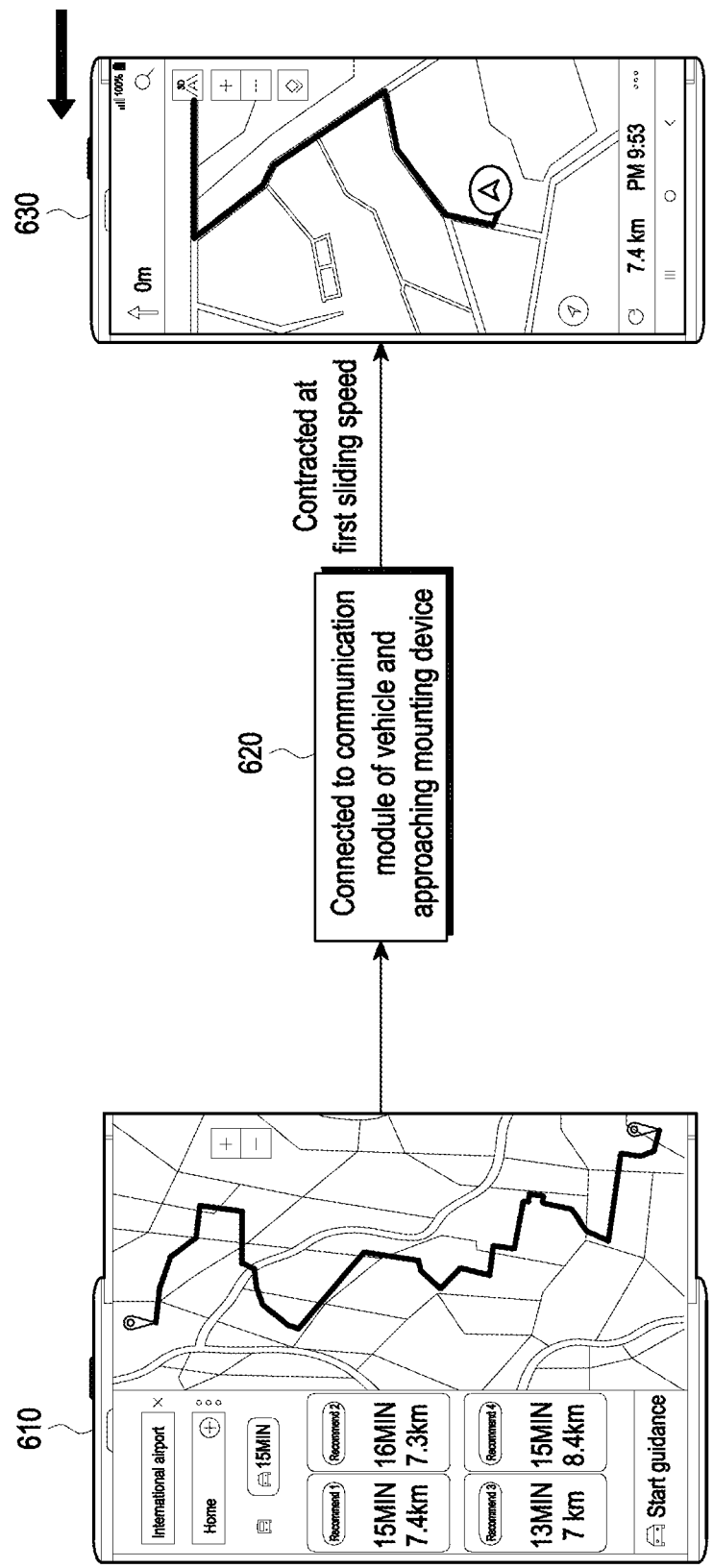
FIG. 6 is a diagram illustrating an operation of controlling a sliding speed of a flexible display in an electronic device according to various embodiments.

FIG. 6 is a diagram illustrating an operation of controlling a sliding speed of a flexible display in an electronic device according to various embodiments. For example, FIG. 6 illustrates a situation in which an electronic device is mounted on a mounting device of a vehicle.

According to various embodiments, referring to FIG. 6, when identifying that an electronic device (e.g., the electronic device 1001 of FIG. 1, the processor 1020 of FIG. 1, or the electronic device 100 of FIG. 2) is connected to a communication module of a vehicle and approaches a mounting device 620 while a flexible display (e.g., the display module 1060 of FIG. 1 or the flexible display 103 of FIG. 2) is in an extended state 610, the electronic device may change the flexible display to a contracted state 630 by contracting the flexible display at a first sliding speed.

For example, when the electronic device is connected to the communication module of the vehicle, the electronic device may identify that it has entered the vehicle. When identifying that the electronic device approaches the mounting device based on a sensor value of at least one sensor (e.g., the sensor module 1076 of FIG. 1), the electronic device may change the flexible display from the extended state to the contracted state by controlling a driving circuit to contract the flexible display at a first sliding speed which is a set default sliding speed.

According to various embodiments of the disclosure, even when a route guidance function is executed in a navigation application instead of a distance to the mounting device after it is identified that the electronic device has entered the vehicle, the electronic device may identify occurrence of an event that the electronic device is about to be mounted on the mounting device.

While it has been illustrated and described in FIG. 6 that a state of the flexible display corresponding to the event that the electronic device is about to be mounted on the mounting device is the contracted state, when the extended state or the contracted state is available to the mounting device and the mounting device is in the extended state, the electronic device may identify the state of the flexible display corresponding to the event that has occurred as the extended state according to various embodiments. For example, when identifying that the mounting device is in the extended state based on a communication module (e.g., the communication module 1090 of FIG. 1) or a sensor value of at least one sensor (e.g., the sensor module 1076 of FIG. 1), the electronic device may identify the state of the flexible display corresponding to the event that has occurred as the extended state. When the flexible display is currently in the contracted state, the electronic device may determine to change the display to the extended state, and when the flexible display is currently in the extended state, the electronic device may determine to maintain the flexible display in the current state.

Figure 7:
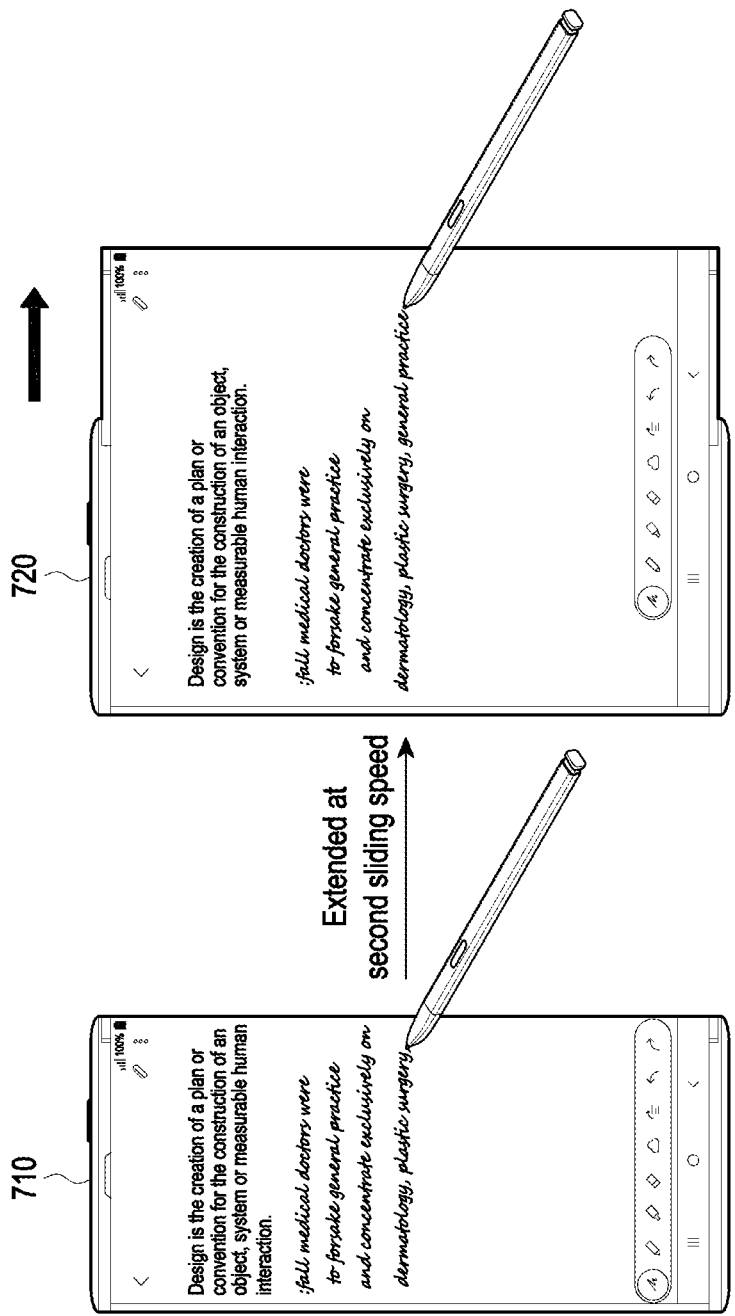
FIG. 7 is a diagram illustrating an operation of controlling a sliding speed of a flexible display in an electronic device according to various embodiments.

FIG. 7 is a diagram illustrating an operation of controlling a sliding speed of a flexible display in an electronic device according to various embodiments. For example, FIG. 7 illustrates a situation in which a writing input is received in an edge area of the flexible display.

According to various embodiments, referring to FIG. 7, upon receipt of a writing input in an edge area of flexible display (e.g., the display module 1060 of FIG. 1 or the flexible display 103 of FIG. 2) while the flexible display is in a contracted state 710, an electronic device (e.g., the electronic device 1001 of FIG. 1, the processor 1020 of FIG. 1, or the electronic device 100 of FIG. 2) may change the flexible display to an extended state 720 by extending the flexible display at a second sliding speed.

For example, when identifying that the coordinates of a position at which a writing is input are an edge area of the flexible display in a writing input mode, the electronic device may change the flexible display from the contracted state to the extended state by controlling a driving circuit to extend the flexible display at a second sliding speed higher than a set default sliding speed.

According to various embodiments of the disclosure, when identifying that the electronic device is placed on a flat surface and stationary after identifying the reception of the writing input in the edge area of the flexible display, the electronic device may identify that the flexible display is to be extended.

Figure 8:
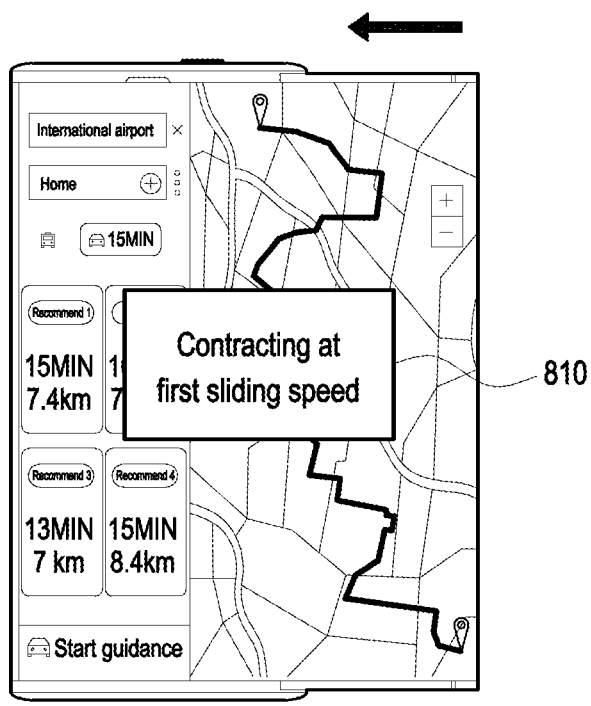
FIG. 8 is a diagram illustrating an operation of providing a feedback for control of a sliding speed of a flexible display in an electronic device according to various embodiments.

FIG. 8 is a diagram illustrating an operation of providing a feedback for control of a sliding speed of a flexible display in an electronic device according to various embodiments. For example, FIG. 8 illustrates a feedback provided when the flexible display is changed from an extended state to a contracted state. According to various embodiments, the feedback illustrated in FIG. 8 may also be applied when the flexible display is changed from the contracted state to the extended state.

According to various embodiments, referring to FIG. 8, when determining to extend or contract a flexible display (e.g., the display module 1060 of FIG. 1 or the flexible display 103 of FIG. 2), an electronic device (e.g., the electronic device 1001 of FIG. 1, the processor 1020 of FIG. 1, or the electronic device 100 of FIG. 2) may extend or contract the flexible display at an identified sliding speed, and provide a feedback 810 including information about at least one of whether extension or contraction is performed or the sliding speed.

For example, when determining to extend or contract the flexible display, the electronic device may provide the feedback 810 at least one of before, during, or after the extension or contraction of the flexible display.

While message display is shown in FIG. 8 as a feedback, a voice feedback or a vibration feedback may be provided as the feedback according to various embodiments. For example, the voice feedback may refer, for example, to information about at least one of whether extension or contraction being performed or the sliding speed of the flexible display being provided by voice. In an embodiment, the vibration feedback may be provided by varying the position, strength, number, and vibration pattern of vibrations according to whether the flexible display is contracted or extended or the sliding speed.

According to various example embodiments, an electronic device may include: at least one sensor, a flexible display at least partially visible to an outside, a driving circuit configured to roll out or roll in the flexible display, and at least one processor operatively connected to the at least one sensor, the flexible display, and the driving circuit. The at least one processor may be configured to: identify occurrence of an event based on a sensor value of the at least one sensor, identify a state of the flexible display, determine whether to roll out or roll in the flexible display and a sliding speed of the flexible display based on the occurrence of the event and the state of the flexible display, and based on determining to roll out or roll in the flexible display, control the driving circuit to roll out or roll in the flexible display at the sliding speed.

According to various example embodiments, the electronic device may further include memory, and the at least one processor may be configured to, based on identifying the occurrence of the event, determine a sliding speed corresponding to the event among a plurality of sliding speeds mapped respectively to a plurality of events stored in the memory.

According to various example embodiments, the at least one processor may be configured to, based on the event satisfying a specified condition, set the sliding speed of the flexible display to a second sliding speed greater than a set first sliding speed.

According to various example embodiments, the electronic device may further include a communication module comprising communication circuitry, and the at least one processor may be configured to, based on identifying that a connection is made to an external device through the communication module, and a distance between the electronic device and an external mounting device is less than a set value based on the sensor value of the at least one sensor, identify the occurrence of the event, and based on the state of the flexible display being an extended state, determine that the flexible display is to be rolled in at a first sliding speed.

According to various example embodiments, the at least one processor may be configured to, based on identifying that an ambient illuminance of the electronic device is less than a specified illuminance value during a specified time based on the sensor value of the at least one sensor, identify the occurrence of the event, and based on the state of the flexible display being an extended state, determine that the flexible display is to be rolled in at a first sliding speed.

According to various example embodiments, the at least one processor may be configured to, based on identifying that a distance between the electronic device and an external wireless charging device is less than a specified value based on the sensor value of the at least one sensor, identify the occurrence of the event, and based on the state of the flexible display being an extended state, determine that the flexible display is to be rolled in at a second sliding speed greater than a set first sliding speed.

According to various example embodiments, the at least one processor may be configured to, based on detection of a writing input in an edge area of the flexible display based on the sensor value of the at least one sensor in a wiring input mode, identify the occurrence of the event, and based on the state of the flexible display being a contracted state, determine that the flexible display is to be rolled out at a second sliding speed greater than a set first sliding speed.

According to various example embodiments, the at least one processor may be configured to, based on detection of fall or submersion of the electronic device based on the sensor value of the at least one sensor, identify the occurrence of the event, and based on the state of the flexible display being an extended state, determine that the flexible display is to be rolled in at a second sliding speed greater than a specified first sliding speed, and the second sliding speed may be a maximum sliding speed of the flexible display.

According to various example embodiments, the at least one processor may be configured to, based on an ambient illuminance of the electronic device being less than a set value based on the sensor value of the at least one sensor in a state where an image is captured by a camera disposed on a front surface of the electronic device, identify the occurrence of the event, and based on the state of the flexible display being a contracted state, determine that the flexible display is to be rolled out at a second sliding speed greater than a set first sliding speed, and the second sliding speed may be a maximum sliding speed of the flexible display.

According to various example embodiments, the at least one processor may be configured to provide a feedback about at least one of whether to roll out or roll in the flexible display or the sliding speed of the flexible display, wherein the feedback may be at least one of a voice feedback, a vibration feedback, or message display.

According to various example embodiments, a method of controlling an electronic device may include: identifying occurrence of an event based on a sensor value of at least one sensor, identifying a state of a flexible display at least partially visible to an outside, identifying whether to roll out or roll in the flexible display and a sliding speed of the flexible display based on the occurrence of the event and the state of the flexible display, and based on determining to roll out or roll in the flexible display, controlling a driving circuit to roll out or roll in the flexible display at the sliding speed.

According to various example embodiments, determining the sliding speed may include, based on the occurrence of the event being identified, determining a sliding speed corresponding to the event among a plurality of sliding speeds mapped respectively to a plurality of events stored in memory.

According to various example embodiments, determining the sliding speed may include, based on the event satisfying a specified condition, setting the sliding speed of the flexible display to a second sliding speed greater than a set first sliding speed.

According to various example embodiments, identifying the occurrence of the event may include, based on identifying that a connection is made to an external device, and a distance between the electronic device and an external mounting device is less than a set value based on the sensor value of the at least one sensor, identifying the occurrence of the event, and determining whether to roll out or roll in the flexible display and the sliding speed of the flexible display may include, based on the state of the flexible display being an extended state, determining that the flexible display is to be rolled in at a first sliding speed.

According to various example embodiments, identifying the occurrence of the event may include, based on identifying that an ambient illuminance of the electronic device is less than a specified illuminance value during a specified time based on the sensor value of the at least one sensor, identifying the occurrence of the event, and determining whether to roll out or roll in the flexible display and the sliding speed of the flexible display may include, based on the state of the flexible display being an extended state, determining that the flexible display is to be rolled in at a first sliding speed.

According to various example embodiments, identifying the occurrence of the event may include, based on identifying that a distance between the electronic device and an external wireless charging device is less than a specified value based on the sensor value of the at least one sensor, identifying the occurrence of the event, and determining whether to roll out or roll in the flexible display and the sliding speed of the flexible display may include, based on the state of the flexible display is an extended state, determining that the flexible display is to be rolled in at a second sliding speed greater than a set first sliding speed.

According to various example embodiments, identifying the occurrence of the event may include, based on detection of a writing input in an edge area of the flexible display based on the sensor value of the at least one sensor in a wiring input mode, identifying the occurrence of the event, and determining whether to roll out or roll in the flexible display and the sliding speed of the flexible display may include, based on the state of the flexible display being a contracted state, determining that the flexible display is to be rolled out at a second sliding speed greater than a set first sliding speed.

According to various example embodiments, identifying the occurrence of the event may include, based on detection of fall or submersion of the electronic device based on the sensor value of the at least one sensor, identifying the occurrence of the event, determining whether to roll out or roll in the flexible display and the sliding speed of the flexible display may include, based on the state of the flexible display being an extended state, determining that the flexible display is to be rolled in at a second sliding speed greater than a set first sliding speed, and the second sliding speed may be a maximum sliding speed of the flexible display.

According to various example embodiments, identifying the occurrence of the event may include, based on an ambient illuminance of the electronic device being less than a specified value based on the sensor value of the at least one sensor in a state where an image is captured by a camera disposed on a front surface of the electronic device, identifying the occurrence of the event, and determining whether to roll out or roll in the flexible display and the sliding speed of the flexible display may include, based on the state of the flexible display being a contracted state, determining that the flexible display is to be rolled out at a second sliding speed greater than a specified first sliding speed. The second sliding speed may be a maximum sliding speed of the flexible display.

According to various example embodiments, the method may further include providing a feedback about at least one of whether to roll out or roll in the flexible display or the sliding speed of the flexible display, and the feedback may be at least one of a voice feedback, a vibration feedback, or message display.

While the disclosure has been illustrated and described with reference to various example embodiments, it will be understood that the various example embodiments are intended to be illustrative, not limiting. It will further be apparent to those skilled in the art that various modifications can be made without departing from the scope of the disclosure, including the appended claims and their equivalents. It will also be understood that any of the embodiment(s) described herein may be used in conjunction with any other embodiment(s) described herein.

What is claimed is:

1. An electronic device comprising:
    a housing including a first housing part and a second housing part configured to movably engage with the first housing part between a retracted position and an extended position,
    at least one sensor;
    a flexible display coupled to the first housing part and the second housing part such that a size of an area of the flexible display that is visible from a front side of the housing changes as the second housing part can be moved between the retracted position and the extended position;
    a driving circuit configured to roll out and/or roll in the flexible display;
    at least one processor comprising processing circuitry; and
    memory storing executable instructions,
    wherein the instructions, when executed by the at least one processor individually or collectively, cause the electronic device to:
    identify occurrence of an event based on a sensor value of the at least one sensor,
    identify a state of the flexible display,
    determine whether to roll out or roll in the flexible display and a sliding speed of the flexible display based on the occurrence of the event and the state of the flexible display, and
    based on determining to roll out or roll in the flexible display, control the driving circuit to roll out or roll in the flexible display at the sliding speed.

2. The electronic device of claim 1, wherein the instructions, when executed by the at least one processor individually or collectively, cause the electronic device to, based on identifying the occurrence of the event, determine a sliding speed corresponding to the event among a plurality of sliding speeds mapped respectively to a plurality of events stored in the memory.

3. The electronic device of claim 1, wherein the instructions, when executed by the at least one processor individually or collectively, cause the electronic device to, based on the event satisfying a specified condition, set the sliding speed of the flexible display to a second sliding speed greater than a set first sliding speed.

4. The electronic device of claim 1, further comprising a communication module comprising communication circuitry,
    wherein the instructions, when executed by the at least one processor individually or collectively, cause the electronic device to:
    based on identifying that a connection is made to an external device through the communication module, and a distance between the electronic device and an external mounting device is less than a set value based on the sensor value of the at least one sensor, identify the occurrence of the event, and
    based on the state of the flexible display being an extended state, determine that the flexible display is to be rolled in at a first sliding speed.

5. The electronic device of claim 1, wherein the instructions, when executed by the at least one processor individually or collectively, cause the electronic device to:
    based on identifying that an ambient illuminance of the electronic device is less than a specified illuminance value during a specified time based on the sensor value of the at least one sensor, identify the occurrence of the event, and
    based on the state of the flexible display being an extended state, determine that the flexible display is to be rolled in at a first sliding speed.

6. The electronic device of claim 1, wherein the instructions, when executed by the at least one processor individually or collectively, cause the electronic device to:
    based on identifying that a distance between the electronic device and an external wireless charging device is less than a specified value based on the sensor value of the at least one sensor, identify the occurrence of the event, and based on the state of the flexible display being an extended state, determine that the flexible display is to be rolled in at a second sliding speed greater than a set first sliding speed.

7. The electronic device of claim 1, wherein the instructions, when executed by the at least one processor individually or collectively, cause the electronic device to:
based on detection of a writing input in an edge area of the flexible display based on the sensor value of the at least one sensor in a wiring input mode, identify the occurrence of the event, and
based on the state of the flexible display being a contracted state, determine that the flexible display is to be rolled out at a second sliding speed greater than a set first sliding speed.

8. The electronic device of claim 1, wherein the instructions, when executed by the at least one processor individually or collectively, cause the electronic device to:
based on detection of fall or submersion of the electronic device based on the sensor value of the at least one sensor, identify the occurrence of the event, and
based on the state of the flexible display being an extended state, determine that the flexible display is to be rolled in at a second sliding speed greater than a set first sliding speed, and
wherein the second sliding speed is a maximum sliding speed of the flexible display.

9. The electronic device of claim 1, wherein the instructions, when executed by the at least one processor individually or collectively, cause the electronic device to:
based on an ambient illuminance of the electronic device being less than a specified value based on the sensor value of the at least one sensor in a state where an image is captured by a camera disposed on a front surface of the electronic device, identify the occurrence of the event, and
based on the state of the flexible display being a contracted state, determine that the flexible display is to be rolled out at a second sliding speed greater than a set first sliding speed, and
wherein the second sliding speed is a maximum sliding speed of the flexible display.

10. The electronic device of claim 1, wherein the instructions, when executed by the at least one processor individually or collectively, cause the electronic device to provide a feedback about at least one of whether to roll out or roll in the flexible display or the sliding speed of the flexible display, and
wherein the feedback includes at least one of a voice feedback, a vibration feedback, or message display.

* * * * *